United States Patent

[11] 3,591,781

| [72] | Inventor | James G. Brenza<br>Putnam Valley, N.Y. |
|---|---|---|
| [21] | Appl. No. | 787,643 |
| [22] | Filed | Dec. 30, 1968 |
| [45] | Patented | July 6, 1971 |
| [73] | Assignee | International Business Machines Corporation<br>Armonk, N.Y. |

[54] MACHINE TOOL CONTROL SYSTEM WITH EDGE GENERATOR
19 Claims, 14 Drawing Figs.

[52] U.S. Cl. ................................................235/151.11,
318/573, 318/608, 235/154
[51] Int. Cl. .............................................G05b 19/30
[50] Field of Search...........................................318/20.100,
20.105, 20.110, 20.132, 20.370; 235/151.11,
151.1

[56] References Cited
UNITED STATES PATENTS

| 2,937,325 | 5/1960 | Garber | 318/28 |
| 3,349,229 | 10/1967 | Evans | 235/151.11 |
| 3,374,359 | 3/1968 | Anderson | 318/28 (X) |

Primary Examiner—Eugene G. Botz
Attorneys—Hanifin and Jancin and Edward S. Gershuny ABSTRACT: A machine tool control system wherein command-position signals (such as square waves) are generated without the use of linear interpolation logic. A number representing a position in time equivalent to each rise or fall of the command-position square wave is generated and placed in a position register, which is compared with a running reference counter. An equal-compare signal reverses the level of a binary trigger and signals the apparatus to supply another number to the position register. The output of the binary trigger is used to generate the command-position square wave.

PATENTED JUL 6 1971 3,591,781

INVENTOR
JAMES G. BRENZA

BY Edward S. Gershung
ATTORNEY

MACHINE TOOL CONTROL SYSTEM WITH EDGE GENERATOR

INTRODUCTION

This invention relates to apparatus for accurately positioning relatively movable objects with relation to each other. More particularly, it relates to methods and apparatus for accurately controlling the relative position of a workpiece and a tool in numerically controlled machine tool systems.

PRIOR ART

It is well-known to supply position information to the controls for each axis of a machine tool in the form of two square waves. One of the square waves is a reference signal having a predetermined frequency, and the other square wave is a command-position signal which has a changing phase displacement relative to the reference signal. The changes in this phase displacement are related to the relative motion desired between the workpiece and the cutting head of the machine tool. The machine tool contains for each axis a phase discriminator, a resolver (position sensor), amplifiers, wave shapers and means for moving the workpiece or the cutting head. All axes of the system respond simultaneously to the difference in phase between a position-indicating feedback signal and the appropriate command-position signal to effect movement along a desired path.

The reference signal establishes basic timing for all axes of the machine tool and is fed to each axis positional sensor to generate the feedback signal. The reference signal is typically obtained by monitoring the high-order trigger of a reference counter which is fed by a free-running reference oscillator. The reference signal will have a frequency that is equal to the frequency of the reference oscillator divided by the number of count conditions of the reference counter. For each axis of the machine tool there is an axis position counter which also receives an input from the reference oscillator. Additional inputs to each axis position counter are commonly supplied by a linear interpolator. These additional inputs comprise pulse streams containing distance information and pulses containing direction information. Depending upon the direction of motion that is desired, the distance information pulses will either be added to or subtracted from the axis position counter. The command-position signal is obtained by monitoring the high-order trigger of the axis position counter.

The linear interpolators commonly used in the prior art develop streams of pulses to indicate distance by repetitive addition. Suppose, for example, that it is desired to contour a straight line segment in two dimensions such that $\Delta X = 8333$ units and $\Delta Y = -6250$ units. Conventionally, $\Delta X$ and $\Delta Y$ are converted to a relatively uniform stream of 8333 and 6250 pulses, respectively, by adding each of the numbers into a separate four-position register 10,000 times and generating a pulse each time that an overflow occurs. If the desired resolution of the machine tool controller is 0.1 mil (i.e., each "unit" equal 0.1 mil) and the maximum travel velocity of the machine tool is 5 inches per second, then for each axis of motion of the machine tool the linear interpolator would need to be able to perform 50,000 additions per second in order to generate the control signals to enable the machine to move at something near its maximum travel velocity. In the case of the example given above, the 20,000 additions (10,000 for each of the X and Y axes) would need to be performed in two-tenths of a second in order to keep the machine tool moving at a rate near its maximum travel velocity.

The primary disadvantage of the prior art as described above is related to the speed with which arithmetic operations must be performed. If the machine tool is to be kept moving at a rate near its maximum travel velocity, it will generally be impractical to use a programmed general purpose computer to perform the interpolation. For example, a three-axis machine tool which has a resolution of 0.1 mil and a maximum travel velocity of 5 inches per second would require an interpolator which could perform 150,000 additions per second (50,000 additions per second for each axis). If a general purpose computer were to be used as the interpolator, it would be reasonable to assume that at least five programming steps would be required for each addition in order to keep track of which axis was being operated upon and to perform various "housekeeping" requirements. Therefore, a general purpose computer would need to perform on the order of 750,000 programming steps per second in order to control one machine tool. It is for this reason that the prior art generally resorts to a special purpose machine to perform interpolation. However, these special purpose interpolators are expensive and one is generally required for each machine tool in a multimachine tool system.

Another disadvantage of the prior art approach described above is its susceptibility to the loss of data due to noise. If the presence of noise on a transmission line causes the system not to recognize the presence of a pulse or causes the system to mistake the noise for a pulse when no pulse is present, the accuracy of the work done by the machine tool will be adversely affected. In some prior art systems, an attempt is made to overcome this problem by using equipment which has a resolution that is finer than the accuracy that is actually required. This technique generally enables adherence to desired tolerances despite the buildup of errors caused by noisy transmission links. However, this solution to the problem introduces the alternative disadvantage of increased cost of the machine tool system.

BRIEF SUMMARY OF THE INVENTION

The above and other disadvantages of the prior art are overcome in accordance with one aspect of this invention by providing apparatus which converts the input digital information ($\Delta X$, $\Delta Y$, $\Delta Z$, etc.) to output analog information (command-position signals) without using a linear interpolator. The linear interpolator is replaced by an edge generator which accepts the input digital data and generates from it a number for each leading edge and trailing edge of the command-position signal for each axis. The relatively complex bidirectional counters used in the prior art are replaced by axis position registers for storing the numbers generated by the edge generator. A reference oscillator and reference counter are used in the same manner as in the prior art to develop a reference signal. A comparator associated with each position register continuously compares the contents of the position register to the contents of the reference counter and produces an output signal whenever the contents are exactly equal. This output signal is used to change the state of a binary trigger and may be used to indicate that a new number must be placed in the associated axis position register. The binary trigger stores a level (1 or 0) and reverses the level with each output of the comparator. The binary trigger output is used to generate the command-position square wave for its associated machine tool axis.

For a machine tool with a controller resolution of 0.1 mil and a travel velocity of 5 inches per second, the command-position signals will typically have a frequency on the order of 200 to 250 cycles per second. This means that there will typically be on the order of 400 or 500 edges (upward and downward excursions) per second in the command-position signal. Thus, the edge generator will seldom need to generate more than 500 numbers per second for each axis of a machine tool. This represents an improvement of 100:1 over the prior art in terms of the number of computations which must be made per unit of time. The method which is used by the edge generator of this invention to generate edge data is more complex than the method used by prior art interpolators to generate pulses. However, the speed at which the edge generator must work is so much less than that required of a prior art interpolator that significant savings may still be realized.

One advantage of this invention over the prior art is in its cost of implementation. One of the reasons that this invention will be less costly to implement is that it may effectively utilize relatively low speed circuitry. Also, in this regard, it should be noted that the speed with which prior art interpolators must perform their computations varies linearly with increases in resolution or travel velocity of the machine tool. In other words, if resolution and travel velocity are each increased by a factor of 2, a prior art interpolator would have to perform its computations four times as rapidly. However, with this invention, computation frequency depends upon the frequency of the command-position signals and this frequency is much less dependent upon resolution and travel velocity.

Another advantage of this invention which flows from its low computation frequency is that it is now more practical to use a programmed general purpose computer for edge number generation. In the above discussion of the prior art, it was noted that a general purpose computer would need to perform approximately 750,000 programming steps per second in order to control a three-axis machine tool having a resolution of 0.1 mil and a travel velocity of 5 inches per second. Even if the method used by this invention for edge number generation were to require twice the number of programming steps for each computation that are required by the prior art, it would be necessary for a programmed digital computer to perform only 15,000 programming steps per second in order to control such a machine tool.

Another advantage of this invention concerns the criticality of timing. In a prior art interpolator which is capable of supplying 50,000 pulses per second to each axis, the time frame for each pulse is only 20 microseconds in duration. For this invention, each successive edge number must be supplied within a time frame of approximately 2,000 microseconds in duration. This relatively long time frame leads to the further advantage that a programmed digital computer could supply edge numbers to the various axis position registers in real time and still be able to control a plurality of multiaxis machine tools or to perform other computations using well-known interrupt techniques.

Another feature of this invention is that the method by which edge numbers are generated (described in more detail below) takes into account all previous edge numbers that were generated during the course of a single straight line cut. This leads to the further advantage that an error which might have been introduced by a noisy transmission link will be compensated for by subsequent correct transmissions. This leads to the further advantage that machine tools used in conjunction with this invention need not be designed to be capable of significantly greater resolution than is required by the job at hand.

Still another advantage of this invention is that the control information generated to direct the cutter along a precise predetermined path is generally more accurate than that obtainable in the prior art.

Yet another advantage of this invention is that its efficiency when compared with the prior art, actually becomes greater as machine tool resolution and travel velocity are improved.

The foregoing and other objects, features and advantages of the invention will be apparent from the following more particular description of preferred embodiments of the invention, as illustrated in the accompanying drawings.

DETAILED DESCRIPTION

Figure 1:
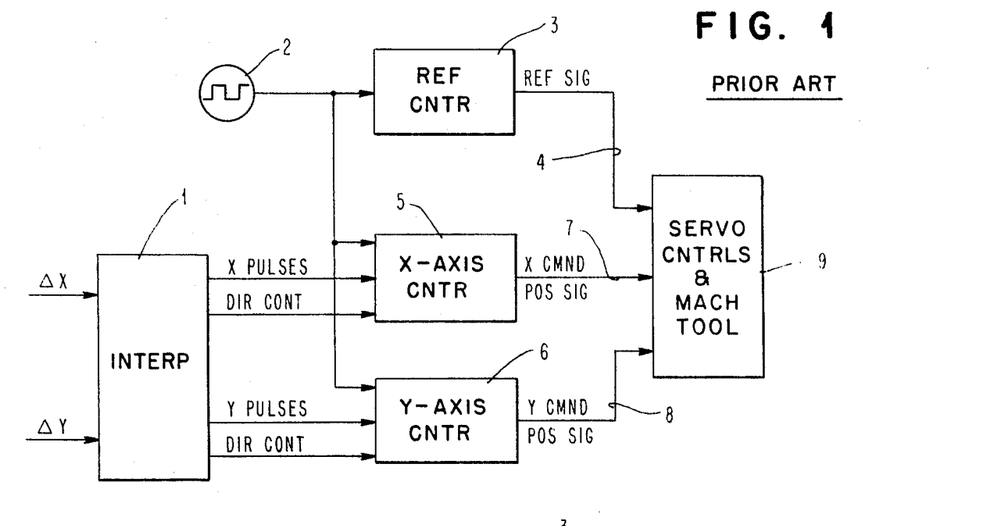
FIG. 1 is a general block diagram of a prior art numerically controlled machine tool system.

FIG. 1 shows a block diagram of various elements of a prior art numerically controlled machine tool system. An interpolator 1 accepts numerical data representing distances that each axis is to move for a given straight line cut. From this data, the interpolator generates, for each axis of motion, a stream of pulses in which each pulse indicates one increment of movement. For each axis, the interpolator also generates a signal which indicates the direction of movement. A reference oscillator 2 supplies signals to a reference counter 3, the high-order trigger of which produces a reference square wave signal on line 4. The output of reference oscillator 2 is also fed to X-axis counter 5 and Y-axis counter 6. (In a machine having more than two axes, there would also be a counter for each additional axis.) X-axis counter 5 receives X pulses and direction control signals from the interpolator, and Y-axis counter 6 receives Y pulses and direction control signals from the interpolator. The pulses received from the interpolator are added to or subtracted from the respective counters in accordance with the appropriate direction control signals. The high-order trigger of the X-axis counter is used to generate an X command-position square wave signal on line 7, and the high-order trigger of the Y-axis counter is used to generate a Y command-position square wave signal on line 8. The reference signal on line 4 and the command-position signals on lines 7 and 8 are fed to the servocontrols and machine tool 9. Within the controls and tool 9, the varying phase difference between a command-position signal and the reference signal furnishes control information to drive a movable bed. Contained within the controls and tool 9 are phase discriminators, resolvers (position sensors), amplifiers, wave shapers and means for moving the workpiece or the cutting head. All of these are well-known in the art and need not be described herein.

Figure 2:
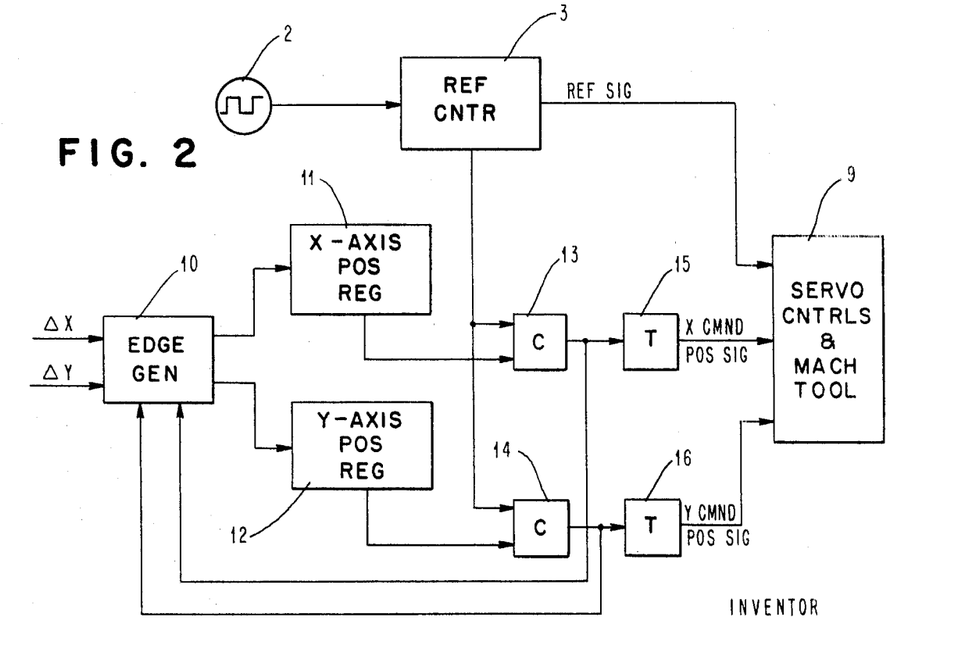
FIG. 2 is a general block diagram of a numerically controlled machine constructed in accordance with this invention.

Referring to FIG. 2, there is shown a simplified block diagram of a numerically controlled machine tool system constructed in accordance with this invention. Parts of the system which may be identical to parts used in the prior art system described above are the reference oscillator 2, the reference counter 3, and the servocontrols and machine tool 9. The system also comprises an edge generator 10 for generating numbers representing the position in time of leading and trailing edges of command-position square wave signals, an X-axis position register 11 and a Y-axis position register 12 for storing edge numbers, a compare unit 13, 14 associated with each axis position register, and a binary trigger 15, 16 associated with each compare unit for generating command-position signals.

The input to edge generator 10 comprises numerical data which indicates the distance of travel for each axis of the machine tool for a given straight line cut. The edge generator operates upon this input data in a predetermined manner to generate a series of numbers which represent the leading and trailing edges (hereinafter referred to as "edges") of the command-position signals that are to be fed to the machine tool. In order that the various edge numbers may be stored, an output of the edge generator is connected to an X-axis position register 11 and another output of the edge generator 10 is connected to a Y-axis position register 12. (In a machine system having more than two axes, there would also be a Z-axis position register receiving a signal from edge generator 10, and a similar position register for each additional axis.) The contents of X-axis position register 11 are compared to the contents of reference counter 3 by a comparator 13 for each count value after oscillator 2 advances the count. Each time that an equal-compare is detected, an output signal from comparator 13 will cause a reversal of state of a binary trigger 15. The output signal from comparator 13 is also fed back to edge generator 10 to cause the edge generator to place the next edge number in X-axis position register 11. The output of binary trigger 15 becomes the X command-position signal. Similarly, the contents of Y-axis position register 12 are compared to the contents of reference counter 3 for each reference count value by a comparator 14 which generates an output signal when a equal-compare is detected. This output signal is fed back to the edge generator 10 to indicate that a new edge number must be supplied to Y-axis position register 12. The output signal from comparator 14 is also fed to binary trigger 16 to alter its state and cause it to generate the Y command-position signal. As in the prior art, the reference signal and the command-position signals are fed to the controls and tool 9 to cause appropriate movement to take place. The comparator output signals are utilized to cause the edge generator 10 to furnish further data to the axis position registers.

Figure 3:
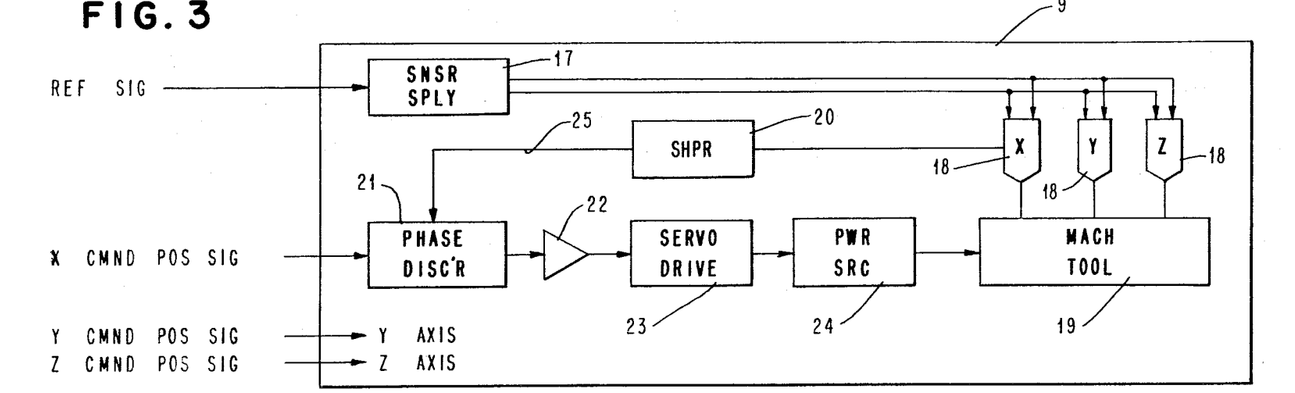
FIG. 3 shows certain details of the servocontrols referred to in FIGS. 1 and 2.

Additional details of the servocontrols are shown in FIG. 3. As shown in FIG. 3, the reference signal is fed to a wave shaper 17 which then feeds timing signals to a position sensor 18 for each axis of the machine tool 19. The position sensor monitors the position of the machine tool to develop a signal that is indicative of the true position of one axis of movement for the tool. This actual-position signal is shaped by a shaper 20 and then fed to a phase discriminator 21. The phase discriminator also receives the command-position signal. The actual position signal (which represents the actual-position of one axis) and the command-position signal (which represents the desired position of this axis) are compared by the phase discriminator 21 which produces an output signal indicative of the phase difference between the actual-position signal and the command-position signal. The phase-difference signal is amplified by amplifier 22 and then fed to the servodrive 23 which controls a power source 24 to effect axis movement of the machine tool 19. Although only the X-axis controls have been described above, each axis of motion of the machine tool is controlled in a similar manner. Movement of the machine tool axis ceases when the feedback signal carried on line 25 is in phase with the command-position signal.

In systems of this type wherein a square wave signal is generated from the high-order trigger of a counter, it will generally be preferable to utilize a counter which operates in accordance with a 5 4 2 1 code for decimal operation or a binary code for binary operation.

The reason that a decimal counter of this type is especially suitable for use as the reference counter is that the high-order trigger will be in each of its states (zero or one) for a consecutive number of time periods equal to half the total number of permissible counter states. That is, in a three-decade counter which can represent the numbers 0—999, the high-order trigger of the third decade will be in its zero state when the counter is representing the numbers 0—499 and will be in its one state when the counter is representing the numbers 500—999. The one output line of the high-order trigger will carry a square wave having a frequency that is one-thousandth that of the referenced oscillator. It will of course be recognized by those skilled in the art that other suitable counters may be chosen.

Before proceeding to a more detailed description of apparatus used in implementing this invention, the methodology which underlies the invention will be developed and described.

Figure 4:
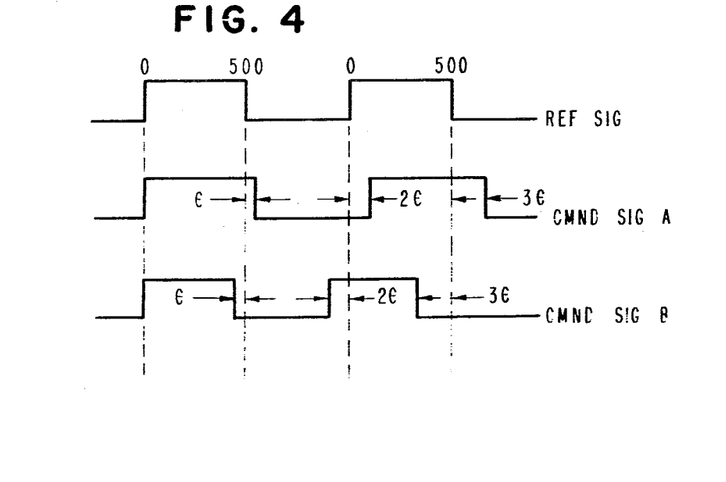
FIG. 4 shows a reference signal and two position command signals.

Consider the situation in which the reference signal systematically changes level at values of zero and 500 in the reference counter. If the values (1) 500+ε
(2) 2ε
(3) 500+3ε were consecutively placed in axis position register A, with the appropriate time spacing, then a phase shift of ε, 2ε, and 3ε would occur for the three consecutive edges of signal A. A reverse shift of comparable amounts occurs for signal B, if signal B values (1) 500 −ε
(2) 1000 −2ε
(3) 500 −3ε were supplied. FIG. 4 shows the reference signal and command signals A and B.

The problem of controlling each axis of the machine tool is primarily one of anticipating each consecutive edge value of the command-position signals, based on the desired velocity, accuracy, and direction of the cutter path along the workpiece, and then of placing those values into the axis-position registers at the appropriate times.

First consider the problem of two counters operating at different count frequencies:

$N_1$ = count rate of counter 01
$N_2$ = count rate of counter 02
$E_1 = N_1 \cdot t$ = instantaneous count value of 01
$E_2 = N_2 \cdot t$ = instantaneous count value of 02
$t$ = time Assuming $N_1 > N_2$, $$N_1 \cdot t = (N_2 \cdot t) + h$$

$$t = \frac{h}{N_1 - N_2}$$

where $t$ equals the value in time when the two counters contain equal values if the slower counter is given an initial value $h$. Furthermore, the count value of equality is:

$$E_1 = E_2 = N_1 \cdot t = h \cdot \frac{N_1}{N_1 - N_2}$$

Figure 5:
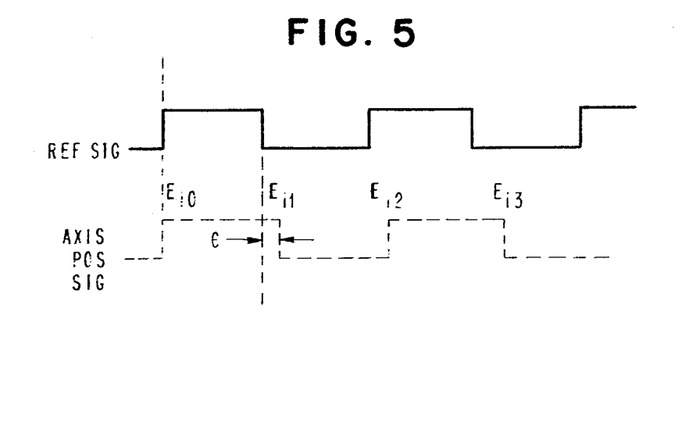
FIG. 5 helps to illustrate the manner in which edge numbers are generated by this invention.

For the axis position signal shown in FIG. 5, the prior derivation yields the following equation:

$$E_{i1} = h \cdot \frac{N_R}{N_R + N_i} \qquad (1)$$

where $E_{i1}$ = first edge value or number to be placed in the position register at the beginning of the cut vector for the $i^{th}$ axis.
$h$ = constant equal to the midcount value of the reference counter
$N_R$ = constant equal to the frequency of the reference counter advance oscillator
$N_i$ = normalized displacement value of the $i^{th}$ axis for the cut vector (axis velocity component) The sign of $N_i$ is the same as the axis direction sign (−forward; + reverse).

Equation (1), when used to compute the first edge value, assumes the atypical case in which the command-position and reference-position square waves are initially in-phase at the start of a new cut vector. In the general case, $E_{i1}$ represents the separation distance between consecutive edges following the first edge. Therefore, successive edges of the cut vector may be generated by adding $E_{i1}$ to the previous edge value. Therefore, $E_{i2} = E_{i1} + E_{i1}$
$E_{i3} = E_{i2} + E_{i1}$
$E_{i4} = E_{i3} + E_{i1}$
$E_{i(n)} = E_{i(n-1)} + E_{i1}$ (2)

An alternate generation for successive edge values is:

$E_{i(n)} = n \times E_{i1}$ (3)

Equation (2) will generally be preferred to equation (3) since addition is usually simpler than multiplication so far as implementation is concerned.

In equation (2) or (3), just the integer portion of the computed edge is used, with high integer (overflow) and fractional portions disregarded at the axis-position registers.

The fractional portion is not used because the servosystem is designed to operate at a predetermined resolution. That is one positional unit (units position of the edge value) of the number base is representative of 0.1 mil resolution in this example. The fractional portion of the numbers give position designations beyond 0.1 mil and are therefore not required by the servocontrols. Higher resolution servosystems may be designed beyond 0.1 mil, and thus utilize the fractional component of the number, or the number system may be changed so that the units position is representative of 0.01 mil, or any other desired resolution. The fractional portions of the edge numbers are carried forward in successive edge value generations, however, in order to maintain the desired accuracy which would otherwise be lost due to accumulated round-off error.

The higher order portions of the edge values beyond 999 are also not used in this example since an incremental servosystem is assumed. Such a servosystem maintains positional control for one rotation of the lead screw for each axis (0—999 controllable positions per each rotation). Positional control to the proper rotation is accomplished externally to the servosystem for incremental servos, or with additional logic for absolute servosystems. For the latter case the higher order positions of the edge values may be employed in the direct servocontrol process.

The general case for generating the first edge value of the new cut vector occurs when the command-position and reference-position square waves are out of phase between adjacent cut vectors, or during an unplanned (e.g., manual override) velocity change within a cut vector. In these cases, an adjustment is required to the first edge of the new cut vector.

Figure 6:
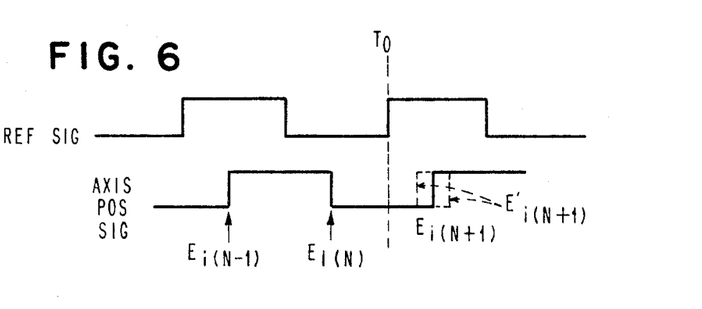
FIG. 6 helps to illustrate the manner in which edge number correction is performed at the beginning of a new cut.

Referring to FIG. 6, assume that a change in velocity is to be initiated beginning at time $T_o$). Such a condition can occur when the machine tool is starting, stopping, ending a prior cut vector, and beginning a new cut vector involving an axis velocity change, and also during an unplanned feed-rate change within a cut vector (manual feed-rate change).

In FIG. 6, $E_{i(n11)}$ is the next-to-last edge of the prior cut vector, $E_{i(n)}$ is the final edge of the prior cut vector, and $E_{i(n+1)}$ is the "would be" position for the next edge following time $T_o$, assuming no velocity change were to take place. The problem then becomes one of generating an adjusted edge position; $E'_{i(n+1)}$, either forward or backward of the $E_{i(n+1)}$ edge, depending on an increase or decrease in velocity.

The process for generating the edge adjustment is one of subtracting the portion of the phase shift accrued in $E_{i(n+1)}$ since $T_o$ due to the prior cut vector, then adding a phase-shift component based on the new velocity since $T_o$; that is $$E'_{i(n+1)} = E_{i(n+1)} \left[ \frac{N_R + N_i}{N_R} \right] \left[ \frac{N_R}{N_R + N'_i} \right] \quad (4)$$

In equation (4), the quantity $$E_{i(n+1)} \left[ \frac{N_R + N_i}{N_R} \right]$$

is obtained by solving equation (1) for a theoretical $h$ which would yield the value of $E_{i(n+1)}$. That theoretical value of $h$ would be the correct value for $E'_{i(n+1)}$ for $N_i=0$ following $T_o$. The second bracketed term in equation (4) then adjusts the theoretical edge position based on the new $N'_i$ by again applying equation (1).

Equation (4) may also be written as:

$$E'_{i(n+1)} = E_{i(n+1)} \frac{\left[1 + \frac{N_i}{N_R}\right]}{\left[1 + \frac{N'_i}{N_R}\right]} \quad (5)$$

where, again $N_i$, $N'_i$, are the normalized velocity components of the $i^{th}$ axis before and after a velocity change, and $N_R$ is the frequency of the reference oscillator (250 kHz). As in equation (1), the signs of $N_i$, $N'_i$ are based on direction ($-$ forward motion, $+$ reverse motion).

Subsequent edges following $E'_{i(n+1)}$ are then generated, as before, by summing the fixed edge incremental value ($E'_{ii}$) until the end of cut, or until the next velocity change. $E'_{ii}$ is computed using equation (1) for the new $N'_i$. Successive edge values are:

$$E'_{i(m)} = E'_{i(m11)} + E'_{i(1)} \quad (2)$$

The "primed" notation has been employed in equations (4) and (5) above to differentiate between the old and new cut vector values.

Normalization is generally needed to modify the cut vector parameters in order to sustain uniform tool velocity, independently of travel distance. Therefore, is the incremental travel distance for each axis is given by the input data as:

X = incremental X travel
Y = incremental Y travel
Z = incremental Z travel (6)

with each displacement given in units of the desired workpiece precision (e.g., 1 unit equal 1/10 mil, 1/100 mil, etc.), then the travel distance for the cut vector $D$ is:

$$D = \sqrt{X^2 + Y^2 + Z^2} \quad (7)$$

for a three-axis tool, with linear displacement of each axis. The parameter $\psi_t$ is now defined as:

$$\psi_t = \frac{V_m}{P} \quad (8)$$

where
$\psi_t$ = workpiece constant equal to maximum rate of phase-signal displacement along the cut vector (phase units/sec.)
$V_m$ = maximum (effective) tangential velocity at the cutting surface (in./sec.)
$P$ = tool displacement per phase unit (in./phase unit), and therefore equal to precision specification; the precision requirement may be varied according to the part tolerance specification The distance of travel $D$, divided by the phase velocity $\psi_t$ gives the cut execution time.

$$T = \frac{D}{\psi_t} \quad (9)$$

where $T$ = cut execution time at normal tool velocity.

Square wave signals are employed to communicate positional data to the servosystem. The frequency of this signal, fixed for a machine tool, now determines the control parameter $R$ needed to establish the "cut completion." Therefore:

$$R = fT \quad (10)$$

where
$R$ = number of cycles or periods of the reference square wave required for cut completion at normal velocity
$f$ = reference square wave frequency
$T$ = cut time in seconds Furthermore, since the cut must be executed in an integral number of periods of the reference signal, $R$ must be made an integer. The fractional portion of equation (10) is therefore discarded or rounded to the next higher integer. Based on the integer value of $|R|$, $$T' = \frac{|R|}{f} \quad (11)$$

where $T'$ is essentially determined from equation (10) by simply dividing by $f$.

It is now possible to generate the normalized phase-shift velocity component for each axis as simply:

$N_X = (X/T')$
$N_Y = (Y/T')$
$N_Z = (Z/t')$ or in general:

$$N_i = (I/T') \quad (12)$$

with $I$ being the incremental travel distance for axis $i$.

The $N_i$ values are those required in equations (1), (4) and (5) for command-position square wave edge generation. Furthermore, the value of $R$ computed by equation (10) is used by the control logic to establish $T_o$ of FIG. 6 (end of cut).

When this invention is used for dynamic control of machine tool clusters, three basic subsystems are required: edge generator subsystem; phase analog subsystem; and cycle control subsystem.

Figure 7:
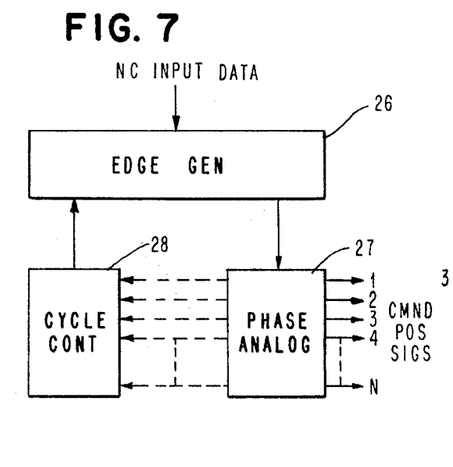
FIG. 7 is a block diagram showing the three principal subsystems of this invention.

FIG. 7 shows, in generalized block diagram form, the manner in which the three subsystems are interconnected. The edge generator subsystem 26 receives input numerical control data for each part during production. The form of the data is equivalent to that prepared by a typical post processor commonly used for off-line numerical control systems. The edge generator transforms the positional command data into edge values in accordance with the methodology previously described. A pregenerated table of edge values may be prepared, or each new value may be generated on demand, upon signal from the control logic subsystem. The phase analog subsystem 27 receives new edge values from the edge generator subsystem and transforms these values into command-position square waves which provide input signals to the axis servoloops of the machine tool. These signals then serve to direct and coordinate the motion of each axis of the machine tool so as to achieve the desired path of the cutting tool along the workpiece. A number of machine tools, each with multiple axes and individual jobs, may be under simultaneous control. The cycle control subsystem 28 serves to communicate information demands from the phase analog subsystem to the edge generator subsystem. The logic includes address control for each axis in order to enable multiplexing of the edge generator subsystem between all active axes.

Figure 8:
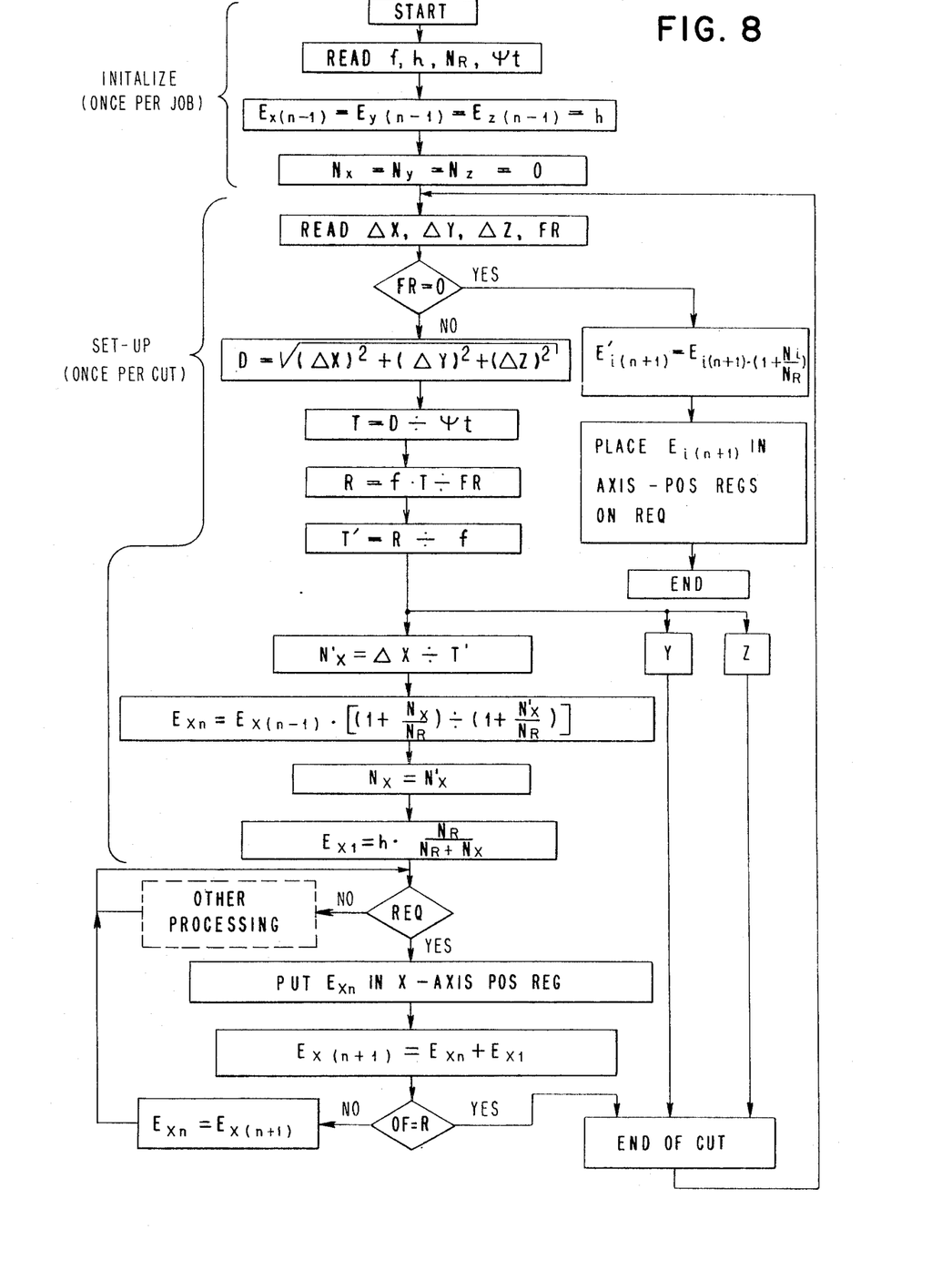
FIG. 8 is an information flow diagram illustrating the methodology of this invention.

The manner in which various information signals are handled by the system is shown in the block diagram of FIG. 8. The signal flow can be divided into four basic sections: (1) initialization, which is performed once for each piece that is to be cut; (2) setup, which is performed once for each straight line cut that is made on the workpiece; (3) edge-number generation, which is performed many times for each straight-line cut; and (4) finalization, which is performed at the conclusion of the cutting of the workpiece.

Initialization

When cutting of a workpiece is to commence, certain parameters of the machine tool that is being used must be supplied to the system. These are $f$ (reference square wave frequency), $h$ (midcount value of the reference counter), $N_R$ (reference oscillator frequency), and $\psi_t$ (maximum rate of phase-signal displacement of the machine tool). Since, in accordance with equation (5) above, the first edge number of a straight line cut generally includes a correction factor related to the last edge number of the previous straight line cut and the previous normalized feed-rate for each axis, it is desirable in the initialization phase to select a previous edge number and normalized feed-rate for each axis. As shown in FIG. 8, the previous edge number for each axis is preferable set equal to $h$ and the normalized feed-rate for each axis is preferable set equal to zero.

Setup

The numerical date supplied to the system for each straight line cut includes the amount of displacement to be effected for each axis and may include a feed-rate (FR) fraction if it is desired that the tool not be run at its maximum travel velocity. The last piece of data to be read in for each workpiece indicates that the job has been completed. This may be done, for example, by indicating that the feed-rate is to be zero. For each straight line cut, the total distance of travel D is computed in accordance with equation (7). The cut execution time T at normal tool velocity is then obtained in accordance with equation (9). The number of cycles of the reference square wave R required for cut completion is obtained by multiplying the reference square wave frequency by the cut execution time at normal tool velocity and dividing by the feed rate fraction. Because an integral number of cycles of the reference square wave must be used, R is rounded to an integral value. A corrected cut execution time T' is then generated by dividing integral R by the reference square wave frequency. All operations which take place after this point are the same for each axis of the machine tool. Details of the methodology are shown in FIG. 8 for only the X-axis. The new normalized feed rate for this cut is generated in accordance with equation (12) and the first edge number is then generated in accordance with equation (5) taking into consideration the previous normalized feed rate for the X-axis and the previous X edge number. The newly generated normalized feed-rate is then transferred to the register or storage unit which held the previous feed-rate. This enables the normalized feed-rate for this cut to be used as the previous normalized feed-rate when the next cut is made. Setup is then completed by generating, in accordance with equation (1), the separation distance $E_{xt}$ between consecutive edges following the first edge.

Edge Generation

During the time that the X-axis position register is not signalling a request for a new edge number, the edge generator is free to perform processing related to the Y- and Z-axes. If requests are not being received from any of the axis-position registers, the edge generator is free to perform processing not directly associated with the machine tool operation. This multiprocessing may be coordinated in accordance with well-known interrupt and cycle-stealing techniques. When the X-axis position register requests a new edge number, the most recently generated edge number will be transferred to it and the next edge number will be generated by adding $E_{xL}$ to the latest edge number. The arithmetic overflow realized from the edge number generation will be compared to R to determine whether or not the straight line cut has been completed. If the cut has not been completed, the newly generated edge number will be placed in the register which held the previous edge number until a subsequent request is received from the X-axis position register. If the straight line cut has been completed, the system will recommence the setup procedure by reading in the next block of data.

Another manner of detecting the end of a straight line cut is to decrement the stored value of R each time that the reference counter returns to an all-zero count (000). The all-zero count will occur at the end of each period of the reference square wave. When R has been decremented to zero, the straight line cut will be complete.

Finalization

When the last record of data relating to the cutting of a given workpiece is detected, one final correction must be made to the last edge value that was generated for each axis. This correction corresponds to generating edge numbers for a next cut that has a feed-rate of zero for each axis. As shown in FIG. 8, the last record may be identified, for example, by denoting its feed-rate fraction as being equal to zero. In this case, the new normalized feed-rate $N'_t$ equals zero and equation (5) may be simplified to the form shown in the upper box on the right-hand side of FIG. 8. After the final edge number has been generated for each axis, each edge number will be placed in the appropriate axis position register when a request is received therefrom. The cutting of the workpiece will then be complete.

It will be clear to those skilled in the art that a machine tool system could be implemented in accordance with this invention in a great variety of ways. However, in accordance with one preferred embodiment of this invention, it is desirable to implement the invention in such a manner that relatively high frequency operations are performed by special-purpose hardware and relatively low frequency operations are performed within a controlling general purpose digital computer. Such an implementation will be described below by describing each of the three subsystems shown in FIG. 7.

Edge Generator

As was mentioned above with reference to FIG. 8, the generation of edge numbers comprises relatively low speed operations (initialization and setup) and relatively high-speed operations (iterative addition and comparison). In implementing the invention, it will generally be desirable to perform the low speed operations in the central processing unit CPU of a general purpose digital computer, and to perform the high-speed operations with special-purpose hardware.

Figure 9:
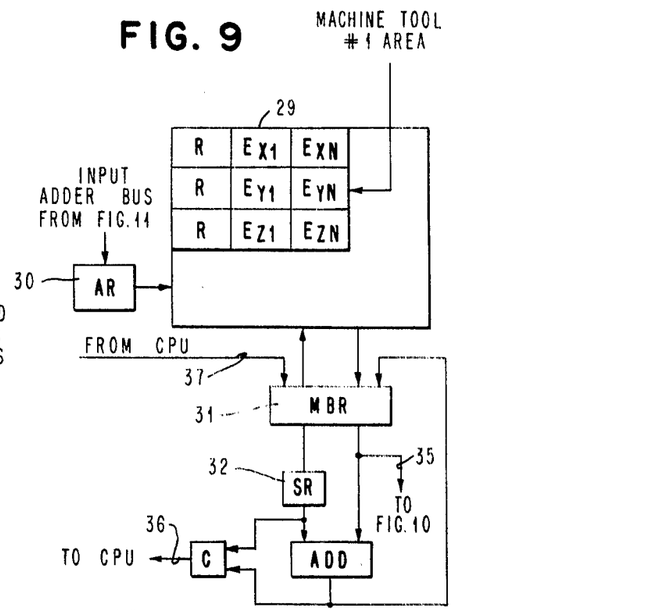
FIG. 9 shows the edge generator subsystem.

FIG. 9 shows, in block diagram form, the special-purpose hardware that is required. It comprises a small memory buffer 29, an address register AR 30 associated therewith, a memory buffer register MBR 31 for transferring data into and out of the memory, a storage register SR 32, an adder 33 for generating successive edge numbers while a given straight line cut is being made, and a comparator 34.

Figure 10:
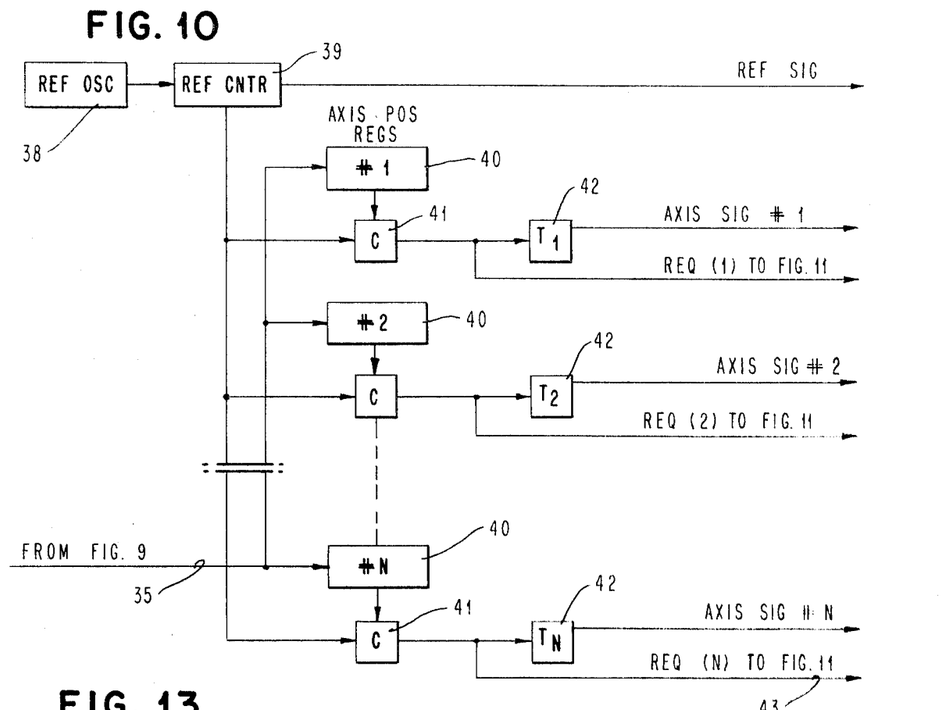
FIG. 10 shows the phase analog subsystem.

For each workpiece that is to be machined, the computations associated with initialization will be performed in a known manner by the CPU (not shown). Also, the computations associated with the setup for each straight line cut will similarly be performed by the CPU. For each straight line cut to be made by each machine tool that is being controlled, the CPU will supply to the special-purpose hardware shown in FIG. 9 the parameters: R(number of reference cycles for the straight line cut); $E_u$ (separation distance between consecutive edges following the first edge); and $E_{in}$ (the first edge number). This data will be stored in the buffer 29 in an area associated with the machine tool to which it pertains. Each time that an axis-position register requires a new edge number, an address will be received from the cycle control system (FIG. 11) and placed in AR 30. This will cause the appropriate separation distance $E_u$ and the appropriate value of R to be read into MBR 31 from where they will be transferred to SR 32. The current edge value $E_{in}$ (including the overflow portion, the integral portion and the fractional portion) will then be read into MBR 31. The significant (integral) portion of $E_{in}$ will be transferred via line 35 to the appropriate axis-position register (FIG. 10). $E_u$ will then be added to $E_{in}$ by adder 33 and placed back in memory buffer 29 via MBR 31 in the position previously occupied by $E_{in}$. The value of R contained in SR 32 will be compared to the overflow portion of the newly generated edge value $E_{in}$ in comparator 34 in order to determine if the final edge number for this axis has been generated. If it has, the CPU will be sent a signal on line 36. When the final edge number for each axis of the machine tool has been generated, the CPU will supply a new set of parameters to the memory buffer 29 on input bus 37. In this preferred embodiment, it is not necessary that the final generated edge number be transmitted to the CPU for use in the computation of the first edge number of the next straight line cut because it is assumed that the CPU will have pregenerated the last edge number in a manner determined in accordance with equations (17) and (18) as described hereinafter.

Phase Analog Subsystem

FIG. 10 shows a logical representation of the phase analog subsystem. This subsystem is primarily composed of the shared reference counter circuitry which comprises a free-running reference oscillator 38 and a reference counter 39, and an axis-position register 40, a compare circuit 41 and an output binary trigger 42 for each axis under control. N simultaneous axes may be controlled with subgroups being assigned to each machine tool.

New edge numbers are placed into the axis-position registers 40 via the input data bus 35 originating from the edge generator subsystem (FIG. 9). Whenever one of the compare circuits 41 produces a signal causing a binary trigger 42 to change level, this signal is also transmitted to the cycle control system (FIG. 11) via one of the lines 43 to initiate the mechanism required to deliver a new edge number to the position register.

Another manner of implementing the phase-analog subsystem would be for each axis to share a single axis position register and comparator. Each value for each axis would be stored in buffer 29 (FIG. 9). Then, with each advance of the reference counter, all axis position register values would be retrieved from the buffer, one at a time, and compared with the reference counter 39. Upon compare-equal conditions, the appropriate trigger 42 would be updated as described above.

Cycle Control Subsystem

Figure 11:
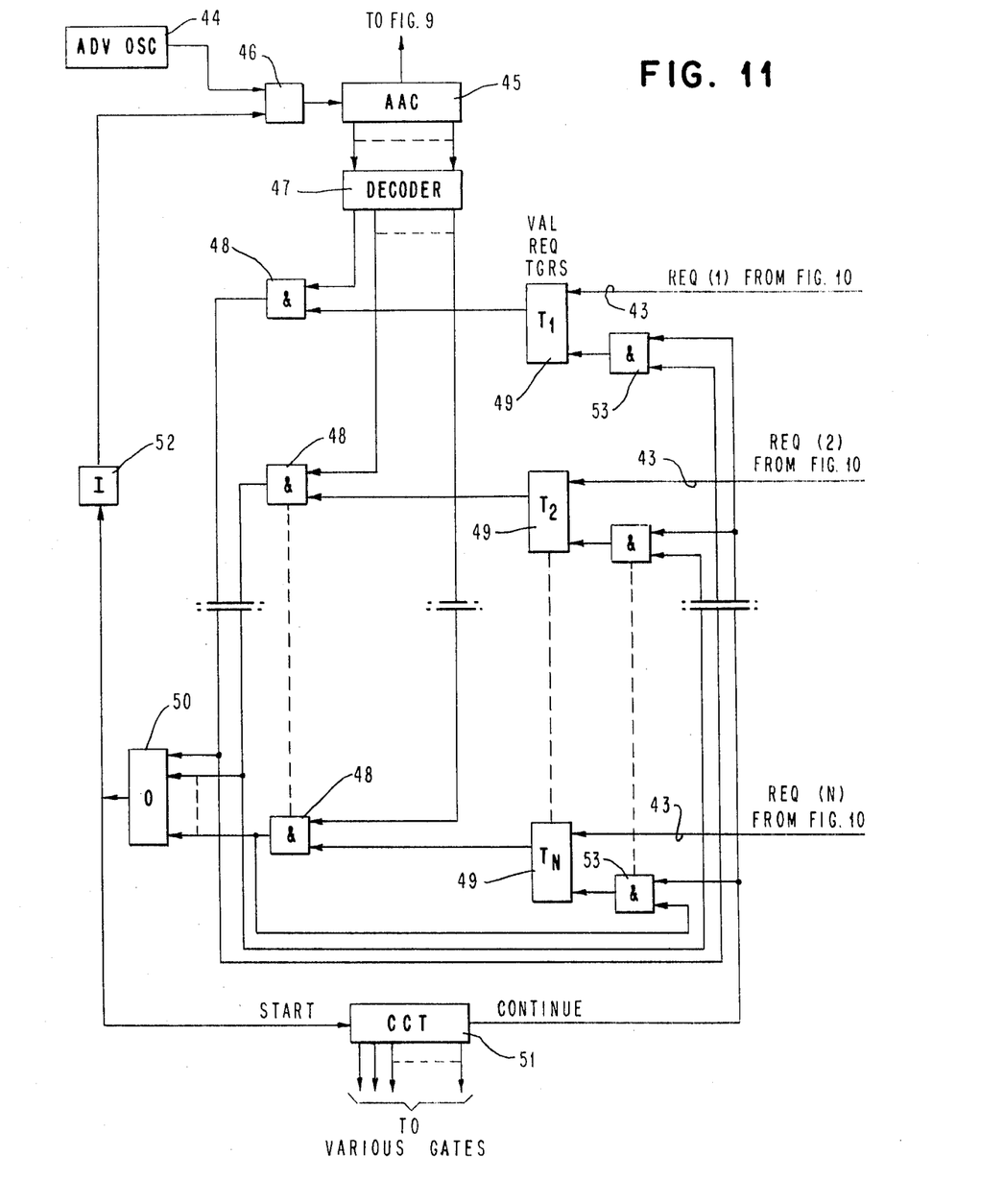
FIG. 11 shows the cycle control subsystem.

The cycle control subsystem shown in FIG. 11 contains a free-running advance oscillator 44 which feeds an axis address counter AAC 45 through a gate 46. The AAC feeds a decoder 47 which has a plurality of outputs each of which will carry a signal when the AAC 45 references the buffer address of data for a machine tool axis associated with the particular decoder output. Each of the decoder outputs feeds an AND circuit 48 associated with one of said axes. Also furnishing an input to each of the AND circuits 48 is a trigger 49 which receives its set input via a request line 43 from the phase analog subsystem (FIG. 10). The output of each of the AND circuits 48 feeds one input of an OR circuit 50 the output of which is used to start a cycle control timer CCT 51 and, after being inverted by inverter 52, to inhibit gate 46 to prevent the contents of the AAC 45 from being altered.

The cycle control subsystem operates on a continuous interrogation basis searching for the next occurrence of a request from an axis-position register. Whenever a request occurs, a signal on line 43 turns on one of the triggers 49. The AAC 45 continues an orderly advance caused by the advance oscillator 44 until a match of the address decoder 47 and a corresponding trigger 49 turns on one of the AND circuits 48. The output of OR circuit 50 signals the cycle control timer 51 to start, and at the same time the signal from inverter 52 disables gate 46 thereby inhibiting any further advance of the AAC 45 and preserving the axis address.

The various outputs of the cycle control timer 51 are used in a known manner to raise the proper gates in order to supply the address of the axis-position register requesting service to the generator subsystem, and to move the next edge number from the edge generator subsystem to the correct axis-position register. At the conclusion of the CCT sequence, the "continue" output of the CCT will act through one of the AND circuits 53 to turn off the request trigger 49. This causes the gate 46 to be enabled, and the search for the next request condition will continue.

Feed-Rate Control

Figure 12:
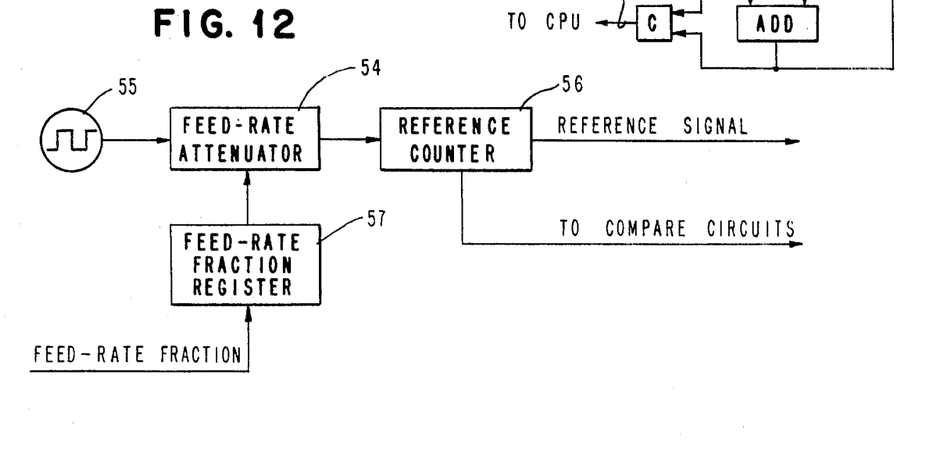
FIG. 12 shows one means for feed rate attenuation.

FIG. 12 shows, in block diagram form, hardware which may be added to the system to provide additional control of the rate of travel of the machine tool bed. In FIG. 12 a feed-rate attenuator 54 is interposed between the free-running oscillator 55 and the reference counter 56. The feed-rate attenuator 54, under control of the data contained in the feed-rate fraction register 57, acts to permit a fraction of the oscillator pulses to pass to the reference counter. This has the effect of changing the frequency of the reference signal and corresponding command-position signals in proportion to the feed-rate fraction. For example, a feed-rate fraction of 0.5 would halve the frequency of the square waves received by reference counter 56. This would result in requiring twice the time for servo resolution by the machine tool of each phase shift, thereby attenuating the tool velocity by an amount equal to the feed-rate fraction. Since this apparatus would require certain frequency band-pass characteristics of the inductive components in the servoloop, only a small frequency range could be used with this apparatus without requiring modifications to most of the servo controls commonly used today.

Figure 13:
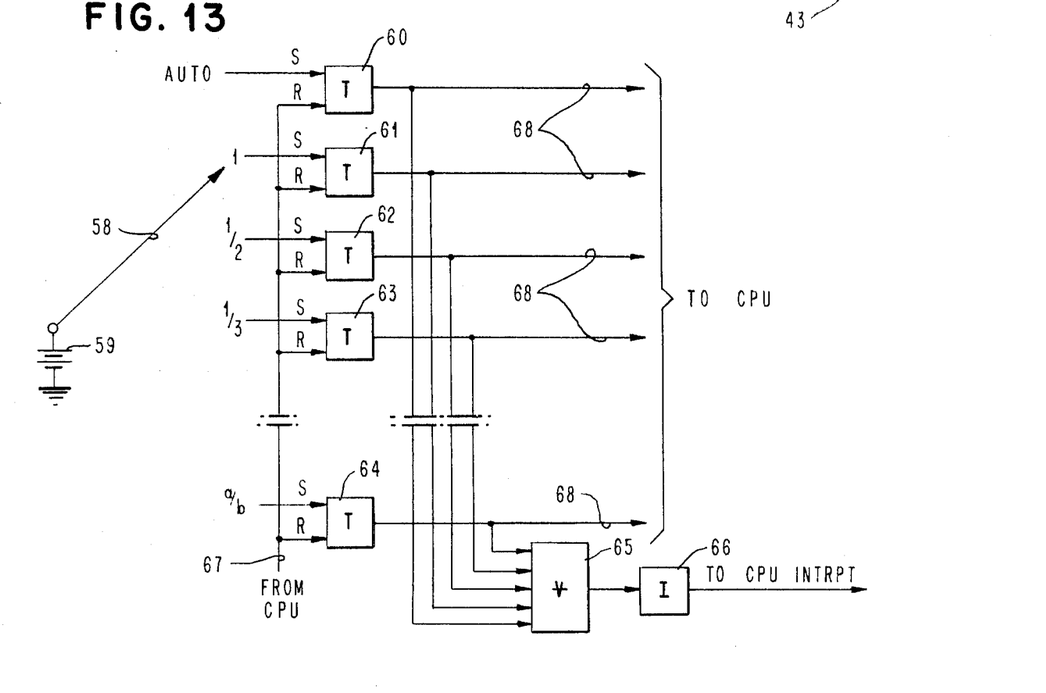
FIG. 13 shows circuitry permitting manual override of feed rate.

Another form of hardware controls for accomplishing control of feed-rate and permitting a broad range of manual override is shown in FIG. 13. This apparatus includes a switch 58 connected to a source of electrical energy 59 which may be connected to the "set" line of any of the triggers 60—64. The output of each trigger is connected to the edge generator (or to the CPU if a CPU is used to perform setup operations). The output of each of the triggers is also connected to an Exclusive-OR circuit 65 The output of Exclusive-OR circuit 65 feeds an inverter 66 the output of which is used to furnish an interrupt signal to the CPU.

When the switch is set to automatic, feed-rate fractions will be determined in accordance with the input data supplied to the system. When the switch is set to any of its other settings, the switch setting will control the feed-rate fraction. If, at any time, the setting of the switch 58 is changed, there will be a period of time during which two of the triggers are in their set condition simultaneously. This will cause the output of Exclusive-OR circuit 65 to fall, causing the output of inverter 66 to send an interrupt signal to the CPU. The CPU will determine the new feed-rate fraction by first issuing a reset pulse to every trigger on line 67 to reset all of the triggers except the one which corresponds to the new feed-rate fraction. A signal which indicates the value of the new feed-rate fraction will be received by the CPU on one of the lines 68.

Numerical Examples

In order to further demonstrate and clarify the methodology of this invention, two numerical examples will be presented. The numbers shown in the examples are only approximate, developed by hand calculations to demonstrate the invention and may not be totally accurate in the fractional portions where precise accuracy is not necessary for this demonstration.

Example 1—Contouring Command

The following numerical example demonstrates the logic for ordinary positional control. A two-axis contouring machine is assumed for simplicity.

Assume that the new cut vector is given to be:
$X = +400$ units
$Y = -300$ units Then equation (7) gives the travel distance, $$D = \sqrt{(400)^2 + (300)^2} = 500 \quad (7)$$

Assuming maximum tangential velocity ($V_m = 1$ in./sec.) and precision ($P = 0.0001$ in.), by equation (8), $$\Psi_t = \frac{1}{.0001} = 10,000 \quad (8)$$

and by equation (9), cut time is:

$$T = \frac{500}{10,000} = 0.05 \quad (9)$$

Equation (10) gives the number of reference cycles $R$ as:

$$R = 250 \cdot (0.05) = 12.5 \quad (10)$$

Choosing integer $R = 12$, $$T' = \frac{12}{250} = 0.048 \quad (11)$$

and $$N_x = \frac{400}{0.048} = 8333.3 \quad (12)$$

$$N_x = \frac{-300}{0.048} = -6250.0 \quad (12)$$

Also, assuming that the feed rate fraction is to be (0.5) for this cut vector, then:

$$N_x = (0.5)(8333.3) = 4166.6 \quad (15)$$
$$N_y = -(0.5)(6250) = -3125.0 \quad (15)$$

$$R = \frac{12}{0.5} = 24 \quad (13)$$

Using equation (1), the incremental edge separation distances are:

$$E_{x1} = 500\left(\frac{250}{250 - 4.1666}\right) = 508.474 \quad (1)$$

$$E_{y1} = 500\left(\frac{250}{250 + 3.1250}\right) = 493.827 \quad (1)$$

For simplicity, assume that the reference signal and axis command signals are initially in-phase. Then the following table gives the values of consecutive edges generated for each axis.

| Edge No. | X-axis | | Y-axis | |
|---|---|---|---|---|
| 1 | | 508 474 | | 493 827 |
| 2 | 1 | 016 948 | 0 | 987 654 |
| 3 | 1 | 525 422 | 1 | 481 481 |
| 4 | 2 | 033 896 | 1 | 975 308 |
| 5 | 2 | 542 370 | 2 | 469 135 |
| 9 | 4 | 576 266 | 4 | 444 443 |
| 10 | 5 | 084 740 | 4 | 938 270 |
| 11 | | | 5 | 432 097 |
| 20 | 10 | 169 480 | 9 | 876 540 |
| 25 | 12 | 711 850 | 12 | 345 675 |
| 30 | 15 | 254 220 | 14 | 814 810 |
| 35 | 17 | 796 590 | 17 | 283 945 |
| 40 | 20 | 338 960 | 19 | 753 080 |
| 46 | 23 | 389 804 | 22 | 716 042 |
| 47 | 23 | 898 278 | 23 | 209 869 |
| 48 | 24 | 406 752 | 23 | 703 696 |
| 49 | | | 24 | 197 523 |

The integer portion of the table values contained within the double-lined columns are supplied to the axis position registers in order to derive the command-position square waves as shown in FIG. 2.

In order to demonstrate that the final destination is properly reached, we will assume that the following cut vector is zero. The situation shown in FIG. 6 is now realized. Forty-eight X edge numbers were generated when the overflow reached 24 R and 49 Y edge numbers were generated. Thus, the edge labeled $E_{x(n+1)}$ in FIG. 6 corresponds to $E_{x48}$ or to $E_{y49}$ of this example where $$E_{x(48)} = 406.572$$
$$E_{y(49)} = 197.523$$

However, since $T_o$ represents the mathematical end of cut ($R=0$), the final edge values of both axes must be adjusted to the change in velocity at $T_o$; therefore, employing equation (5), $$E'_{x(48)} = 406.572\left[1 + \frac{-4.1666}{250}\right] = 399.98 \text{ (400 by rounding)} \quad (5)$$

and $$E'_{y(49)} = 197.523\left[1 + \frac{+3.125}{250}\right] = 199.99 \text{ (200 by rounding)} \quad (5)$$

In actual practice, the $E'_{x(48)}$ and $E'_{y(49)}$ edge values would have been computed in anticipation of the end of cut and placed in the table initially. The original problem has thus been solved by uniformly advancing the x-axis +400 units and retarding the y-axis (200−500) = −300 units, at one-half maximum total velocity.

Example 2—Unplanned Feed Rate Change

Suppose it is desired to institute an unplanned feed-rate change within a cut vector. For this example we will arbitrarily select an instant in time ($R = 19$) from our prior example as the moment in which the new feed rate is to begin. Also assume that the desired velocity after attenuation is to be approximately nine-tenths the present velocity. Then, instead of there being 19 reference cycles remaining until cut completion, there will be $$|R'| = \left|\frac{19}{0.9}\right| = 22 \quad (13)$$

and $$f'_r = 19/22 = 0.86364 \quad (14)$$

and the revised phase velocity components are:

$$N'_x = 4166.6 (0.86364) = \quad (15)$$
$$N'_y = -3125 (0.86364) = -2698.9 \quad (15)$$

By equation (1), the edge separation values are:

$$E'_{x1} = 500\left(\frac{250}{250 - 3.5985}\right) = 507.295 \quad (1)$$

$$E'_{y1} = 500\left(\frac{250}{250 + 2.6989}\right) = 494.660 \quad (1)$$

and the adjustments to the starting edges are $$E'_{x(n+1)} = E'_{x(10)} = 084.742\left[1+\left(\frac{4.1666}{250}\right)\right]$$
$$\left[1+\left(\frac{-3.5985}{250}\right)\right] = 084.575$$
(5)

$$E'_{y(n+1)} = E'_{y(11)} = 432.097\left[1+\left(\frac{3.1250}{250}\right)\right]/$$
$$\left[1+\left(\frac{2.6989}{250}\right)\right] = 432.974$$
(5)

Based on the new set of starting edges $E'_{i(n+1)}$ and edge separation values ($E'_{ii}$) due to the revised feed rate, the following table gives the changes in edge values of the previous table.

| Edge No.: | X-axis | | Y-axis | |
|---|---|---|---|---|
| 1 | 508 | 474 | 493 | 827 |
| . | | | | |
| . | | | | |
| 8 | | | | |
| 9 | 4 | 576 266 | 4 | 444 443 |
| 10 | 5 | 084 575 | 4 | 938 270 |
| 11 | 5 | 591 870 | 5 | 432 974 |
| 12 | 6 | 099 165 | 5 | 927 634 |
| . | | | | |
| . | | | | |
| . | | | | |
| . | | | | |
| 53 | 26 | 898 260 | | |
| 54 | 27 | 405 555 | 26 | 703 354 |
| 55 | | | 27 | 136 014 |

Again assuming the following cut vector to be zero, the final edge values are:

$$E'_{x(54)} = 405.555\left[1-\frac{3.5985}{250}\right] = 399.72 = 400 \text{ (rounded)}$$
(5)

$$E'_{y(55)} = 198.014\left[1+\frac{2.6989}{250}\right] = 200.08 = 200 \text{ (rounded)}$$
(5)

as in the prior example.

The horizontal line of this table separates the table values prior to and following the feed-rate change. Note that the implementation of the velocity change begins with the first edge of each axis-position signal following the moment in which the reference signal returns to zero (integer R cycles). In this example the appropriate edges are $E_{x(10)}$ and $E_{y(11)}$ as shown in the table.

The optimum moment to initiate an unplanned feed-rate change is somewhat arbitrary, and is dependent upon the specific implementation. In general, a convenient time may be chosen following the request in order to mitigate the instantaneous processing demands on the system, while still observing the response requirements of the operator. For example, if a 1 second response were required, then the change should be introduced into the data stream prior to the 500th future edge, since each edge is separated by approximately 2 milliseconds in time (for a 250 Hz. reference signal).

The numbers shown in the two tables of the preceding examples have been "rounded" to some extent because the fractional portion has been limited to three decimal places. Despite this, the final error along each axis of motion is within three-tenths of a unit in the worst case shown, and within one-tenth of a unit in three of the four cases shown. These round-off errors are well within commonly accepted tolerances. Of course, even this small error can easily be reduced by carrying a larger number of fractional places in the edge number generation.

Digital Feedback Servosystems

The basic methodology presented for the generation of the command-position square wave information assumes that an analog positional-sensing transducer (e.g., linear or rotary resolver) is used to derive the actual machine-tool position. After reshaping, this feedback signal is fed, together with the command-position signal, to a phase-discriminator mechanism in order to derive the "error signal" input for the servoamplifiers. However, if instead a digital transducer is employed to sense the actual machine-tool position for feedback to the phase discriminator, a minor modification is required to the hardware arrangement of FIG. 2. The digital numbers placed in the command-position registers (edge values) are equivalent to the digital representation of the desired machine-tool axis position through time. A digital comparison of each command-position register value with the corresponding actual position value obtained from the feedback transducer could be performed directly, thereby accomplishing the phase discrimination. In such digital feedback systems, an analog voltage is then supplied to the servodrive amplifiers, proportional to the value of the unequal comparison, with the voltage being zero for compare/equal. The digital feedback system therefore eliminates the need to convert command-position data to square wave data for phase discrimination, but requires the substitution of the implied comparison logic.

Figure 14:
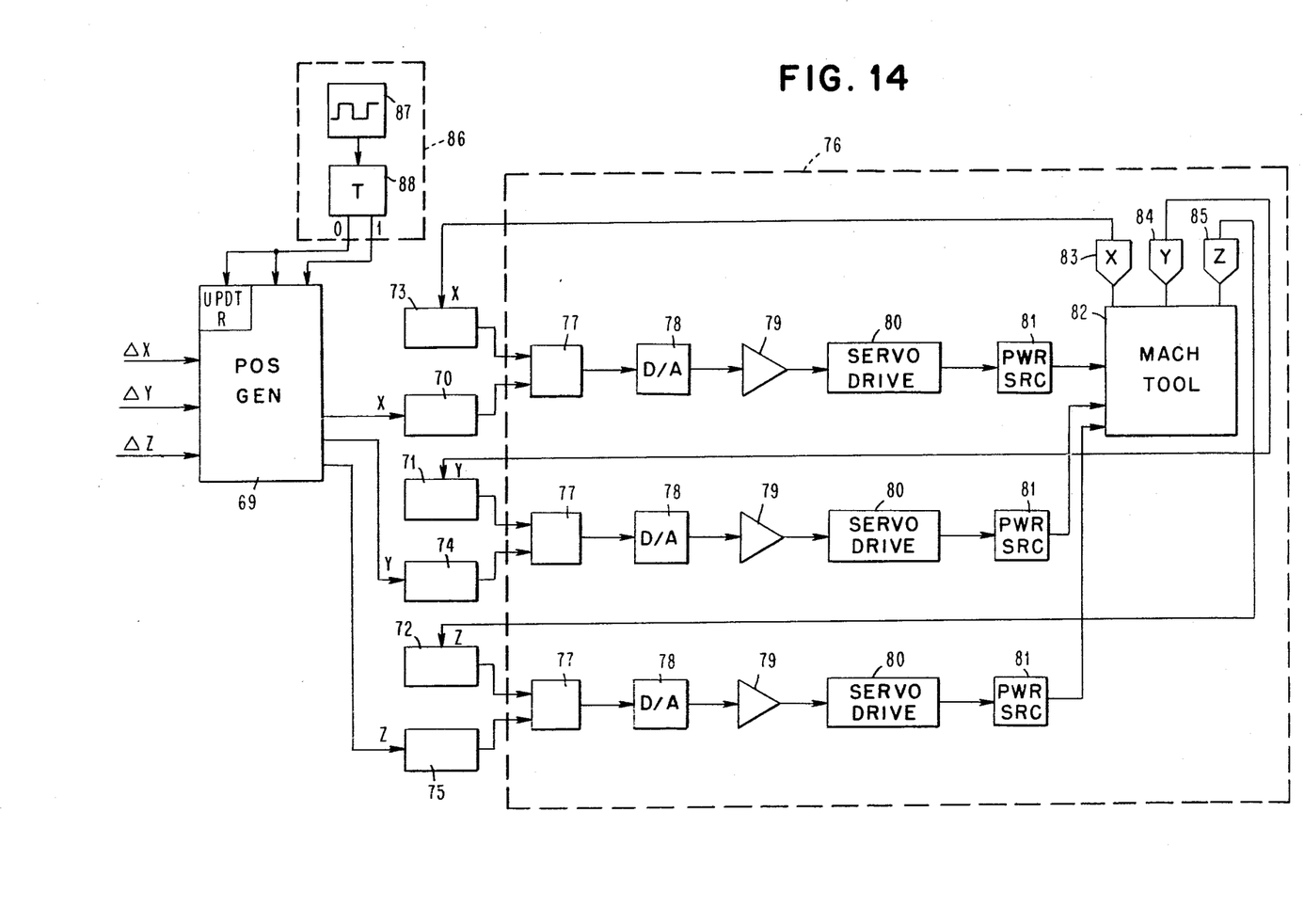
FIG. 14 is a general block diagram of a digital feedback servo-controlled machine tool system constructed in accordance with another aspect of the invention.

A machine tool system utilizing digital feedback servos is shown in FIG. 14. The position generator 69 receives axis-motion data for each straight line cut in a manner similar to that described above for the edge generator. The position generator generates command-position information and places it at appropriate times in X, Y and Z command-position registers 70, 71, 72. X, Y and Z actual-position registers 73, 74, 75 each contains a digital representation of its associated axis. The output of each command-position register and actual-position register is fed to the servocontrols and machine tool 76 shown within the broken lines. The servocontrols will generally comprise, for each axis, a subtracter 77 for determining the difference between the contents of the command-position and actual-position registers, a digital-to-analog converter 78 for converting the output of the subtracter to an analog signal related to the difference, an amplifier 79 for amplifying the analog signal, a servodrive 80 which receives the amplified signal, and a power source 81 which responds to the servodrive to cause movement of the appropriate axes of the machine tool 82. Also included within the system is an X, a Y and a Z axis transducer 83, 84, 85 which senses the actual position of each machine tool axis and feeds this information to the actual-position registers 73, 74, 75.

In generating position numbers for each axis, the total number R of reference clock cycles is determined by the position generator 69 in accordance with equations (7) (8), (9) and (10), and adjusted for any given feed-rate fraction. Assuming that a new position number will be supplied twice during each reference cycle, R is doubled and the number 2R (expressed as an integer) is divided into the number or units of motion desired for each axis to obtain the motion desired during each half-cycle. The number thus generated for each axis is the first command-position number for that axis. When the first straight line cut commences, each first command-position number will be placed in the appropriate command-position register. One-half cycle later, twice that number will be placed in each command-position register. After each subsequent half-cycle, until the cut is complete, the contents of each command-position register will be replaced by a number which is more than the previous contents by an amount equal to the first command-position number. For each subsequent straight line cut, a new first command-position will be generated for each axis by the position generator and will be repetitively added to (or subtracted from) the previous value in each command-position register and the result placed in the appropriate command-position register.

Basic timing for this system is supplied by a clock 86 which may comprise an oscillator 87 operating at twice the reference frequency and feeding a binary trigger 88. The "zero" and the "one" outputs of the trigger are used to signal the position generator twice during each reference cycle that a new command-position is required by each command-position register 70—72. The "zero" output of trigger 88 is used to signal the position generator 69 that a reference cycle has been completed. In a preferred embodiment of this invention, each time that a reference cycle is completed, the stored value of R will be decremented by 1. When R reaches 0, the straight line cut has been completed.

Example 3—Contouring Command

In a two-axis contouring machine, assume that the new cut vector is given to be:

X=+400 units
Y=−300 units and that the value of R has been determined to be:

R=19.3

Rounding R to the next higher integer yields:

R (integer)=20

Also assume that, at the conclusion of the previous straight line cut, the X command-position register contained the value 864 and the Y command-position register contained the value 1216. Since 2R=40, the first command-position number for each axis is:

$E_{1x}$=400/40=10.00
$E_{1y}$=−300/40=−7.50

The following table shows the value of consecutive command-position numbers generated for each axis.

| Position No.: | X | Y |
|---|---|---|
| 1 | 874.00 | 1,208.50 |
| 2 | 884.00 | 1,201.00 |
| 3 | 894.00 | 1,193.50 |
| 4 | 904.00 | 1,186.00 |
| 5 | 914.00 | 1,178.50 |
| . | | |
| . | | |
| . | | |
| 18 | 1,044.00 | 1,081.00 |
| 19 | 1,054.00 | 1,073.50 |
| . | | |
| . | | |
| . | | |
| 30 | 1,164.00 | 991.00 |
| 31 | 1,174.00 | 983.50 |
| . | | |
| . | | |
| . | | |
| 38 | 1,244.00 | 931.00 |
| 39 | 1,254.00 | 923.50 |
| 40 | 1,264.00 | 916.00 |

After 40 command-position numbers have been generated, R will have been decremented to zero, signifying the end of the straight line cut, and the X axis of the machine tool will have moved 400 units in the positive direction while the Y axis will have moved 300 units in the negative direction.

Look-Ahead

The problem of look-ahead arises whenever it is desired to choose a convenient future period during which to institute an unplanned feed-rate change or when it is desired to generate in advance the number of edge values required for each axis in order to execute a desired cut.

Postponing the initiation of the feed-rate change to some future period will permit ample time to determine the changes to the "edge data" stream without interrupting the continuous flow. This look-ahead interval must be short enough, however, to affect the feed-rate change within an acceptable response time for the operator. For example, 100 msec. (1/10 sec.) may be selected as the look-ahead interval, thereby insuring response times well within human reaction time.

Since each axis has a separate data stream, the problem to be solved in look-ahead is to find the corresponding set of edges, $E_{i(n+1)}$, so that equation (5) can be applied for the new feed-rate for each axis $i$. Assume the following definitions:

$T_1$ = first new cycle of reference signal following feed-rate change notification.

$E_{i(m)}$ = last edge number for $i^{th}$ axis prior to $T_1$.

N = number of look-ahead cycles; e.g. look-ahead interval of 100 msec. requires N=25 for a 250 Hz. reference signal.

$T_2$ = moment of institution of feed-rate change.

$E_{i(n+1)}$ = first edge number of position signal following $T_2$ based on unchanged feed-rate.

The problem is then to generate the edge number $E_{i(n+1)}$.

The total distance between $E_{i(m)}$ and $T_2$ measured in edge units is:

$$(M-E_{i(m)})(M \cdot N)$$

where the first quantity is the distance to $T_1$, and the second is the distance between $T_1$ and $T_2$. M is the reference counter constant (1000).

The number of edges B in this space is determined simply by dividing by the edge displacement value, $E_{i1}$, determined by equation (1); therefore:

$$B_i = \frac{M(N+1) - E_{i(m)}}{E_{i1}}$$

or $$B_i = \frac{K - E_{i(m)}}{E_{i1}} \quad (16)$$

where K = constant chosen for the tool. Since it is the first edge following $T_2$ that we are seeking, the fraction of B is discarded, and the next higher integer value is chosen.

If the consecutive edge values have been pregenerated in a table, the correct values for $E_{i(n+1)}$ may be obtained by indexing forward B units in the table. Otherwise, it may be generated directly by equation (17) as follows:

$$E_{i(n+1)} = E_{i(m)} + B_i \cdot E_{i1} \quad (17)$$

To generate the number of edge values required to execute a new cut vector, independently of velocity changes, a similar rule applies. If we assume that $E_{i(n+1)}$ is the first edge of the new cut vector, then:

$$B_i = \frac{R \cdot M - E_{i(m+1)}}{E_{i1}} \quad (18)$$

where R is again the number of reference cycles given by equation (10). The fractional value of B is again discarded and the next higher integer value is chosen in order to compute $E_{i(n+1)}$ in equation (17).

Axis Idle

Axis idle is defined as a period of time in which no positional phase occurs, and therefore no phase advancement takes place in the command-position square wave signal for a particular axis. This condition can occur as follows:

during the execution of a contouring instruction in which one or more axes requires no incremental displacement; dynamically during a contouring command when the error signal exceeds a limit (in this case all active axes are temporarily set to the idle mode); during the momentary idle period between motion commands; after job setup but prior to beginning; and in other similar situations. In these circumstances, it is necessary to supply a continuous command-position square wave to the servoloop, but one that sustains a constant phase position relative to the reference signal. The apparatus described above does this, but it may also be conveniently accomplished as follows (see FIG. 2). Each command-position register feeds a compare circuit to detect the moment in which the two registers contain equal values (when the axis is in the nonidle mode). At the conclusion of a cut vector when the "idle mode" is to be instituted for a particular axis, an "enable idle line" could be raised to the compare circuit which would have the effect of disengaging the highest order trigger of the subject axis-position register from the comparison process. With a symmetrical code structure used for the axis-position register, two outputs will now emit from the compare circuit per period of the reference square wave. These outputs will alternately repeat at the last edge value placed in the axis-position register and at a second edge value displaced h or 500 phase units in time. These outputs generate at the binary trigger a continuous command-position square wave with zero phase shift as long as the idle line remains enabled. Furthermore, the static phase position of the idle-axis square wave is at the position set by the last motion command applied to the axis.

Other Variations of the Invention

As has been mentioned above, it will generally be desirable to implement certain portions of this invention within a general purpose computer, and to implement other portions of the invention in special-purpose hardware. Although the specific implementation described above is a preferred embodiment of the invention, it will be recognized by those skilled in the art that more (or even all) of the invention could be implemented in a special-purpose hardware than has been shown herein. It will also be recognized by those skilled in the art that certain aspects of the invention (particularly various aspects shown in FIG. 9) could be implemented within a general purpose computer instead of in special-purpose hardware as shown herein.

Another useful variation of the invention would involve an intermediate storage medium such as a magnetic tape or disc. Such a medium could be used to store pregenerated values of the parameters which serve as input to the apparatus shown in FIG. 9. The tape or disc could then be used many times if a succession of identical parts are to be machined eliminating the necessity to regenerate these parameters. Also, if a general-purpose computer is used for generating these parameters, such an approach might permit more convenient scheduling of machine time.

Another variation would be to pregenerate complete tables (such as those shown above in the section entitled Numerical Examples). Such tables could then furnish direct input to apparatus such as that shown in FIG. 10. Again, this approach could lead to more convenient scheduling of machine time and to more efficient use of the machine.

While the invention has been particularly shown and described with reference to preferred embodiments thereof, it will be understood by those skilled in the art that various changes in form and details may be made therein without departing from the spirit and scope of the invention.

What I claim is:

1. In a numerically controlled machine tool system wherein input digital data are converted to a command-position signal having a varying phase displacement between itself and a reference signal, means for generating said command-position signal comprising:

first means having at least one input and at least one output, said means receiving at its input said input digital data, said means generating at its output a succession of digital signals each related to a time at which the level of said command-position signal is to change;

register means connected to the output of said first means for temporarily storing each signal in said succession of digital signals;

reference counting means;

comparing means having an input connected to said register means and an input connected to said reference counting means for manifesting an output signal when the contents of said register means equals the contents of said reference counting means and means connected to the output of said comparing means for changing the level of said command-position signal in response to each output signal from said comparing means.

2. A machine tool control system for generating a command-position signal for each axis of at least one multiaxis machine tool comprising:

a source of signal indicating the desired travel of each machine tool axis for each straight line cut;
   number generating means;
   means connecting said source to said number generating means;
   said number generating means being responsive to signals supplied by said source to generate representations of numbers indicating the times of rise and fall of each command-position signal;

a plurality of register means each associated with an axis of said machine tool;

means connecting said number generating means to each of said register means for transmitting to the register means associated with each one of said axes the ones of said representations of numbers which indicate the times of rise and fall of the command-position signal associated with said one of said axes;

reference counting means;

compare means associated with each of said register means, each of said compare means receiving a first input from its associated register means and a second input from said reference counting means, each of said compare means producing an output signal when the contents of its associated register means equals the contents of said reference counter means; and means associated with each of said compare means for changing the voltage level of one of said position-command signals.

3. The machine tool control system of claim 2 wherein:
   the outputs of said compare means are operatively connected to said number generating means;
   said number generating means being responsive to an output signal from one of said compare means for supplying a new one of said representations of numbers to the register means associated with said one of said compare means.

4. A numerically controlled machine tool system comprising:

at least one machine tool having at least one axis of motion;
   a source of input data specifying the desired travel of said one axis for each straight line cut;
   a source of periodic reference timing signals;
   position generating means operatively connected to said sources for receiving said input data and said timing signals;
   said position generating means including means for determining from said input data the number of reference periods required for each straight line cut, the amount of movement required for said axis during a given portion of each reference period, and a desired position for said axis during each portion of each reference period;
   desired position means associated with said axis and operatively connected to said position generating means for receiving therefrom a signal representing the desired position of said axis;
   sensing means for sensing the position of said axis;
   actual position means associated with said axis and operatively connected to said sensing means for receiving therefrom a signal representing the actual position of said axis;
   difference means associated with said axis and receiving inputs from said desired position means and said actual position means;
   said difference means generating a signal related to the difference between the contents of said actual position means and said desired position means; and
   means connected between the contents of said actual position means and said desired position means; and
   means connected between said difference means and said machine tool for moving said axis at a velocity related to the signal generated by said difference means.

5. The machine tool system of claim 4 wherein:
   said given portion of each reference period is equal to one-half of each reference period.

6. The machine tool system of claim 4 further including:
   means for determining that said number of reference periods required for a straight line cut have elapsed; and
   means connecting said last-mentioned means to said position generating means for causing said position generating means to supply to said desired position means signals relating to the next straight line cut 7. A numerically controlled machine tool system comprising:
- at least one machine tool having at least one axis of motion;
- a source of input data specifying the desired travel of each axis for each straight line cut,
- a source of periodic reference timing signals;
- position generating mans operatively connected to said sources for receiving said input data and said timing signals;
- said position generating means including means for determining from said input data the number of reference periods required for each straight line cut, the amount of movement required for each axis during a given portion of each reference period, and a desired position for each axis during each portion of each reference period;
- a plurality of desired position means each associated with an axis and operatively connected to said position generating means for receiving therefrom a signal representing the desired position of its associated axis;
- sensing means for sensing the position of each axis;
- a plurality of actual position means each associated with an axis and operatively connected to said sensing means for receiving therefrom a signal representing the actual position of the associated axis;
- a plurality of difference means each associated with an axis and receiving inputs from the desired position means and the actual position means associated with said axis;
- each of said difference means generating a signal related to the difference between the contents of the actual position means and the desired position means associated with its associated axis;
- means connected between said difference means and said machine tool for moving said associated axis at a velocity related to the signal generated by the difference means;
- means for determining that said number of reference periods required for a straight line cut have elapsed; and
- means connecting said last-mentioned means to said position generating means for causing said position generating means to supply to said desired position means signals relating to the next straight line cut.

8. A machine tool control system for generating a command-position signal for an axis of a machine tool comprising:
- a source of signals indicating the desired length of travel of said axis for each straight line cut;
- number generating means;
- means connecting said source to said number generating means;
- said number generating means being responsive to signals supplied by said source to generate representations of numbers indicating the times of rise and fall of said command-position signal;
- register means associated with said axis;
- means connecting said number generating means to said register means for transmitting to said register means said representations of number which indicate said times of rise and fall of said command-position signal;
- reference counting means;
- compare means associated with said register means, said compare means receiving a first input from said register means and a second input from said reference counting means, said compare means producing an output signal when the contents of said register means is equal to the contents of said reference counting means; and
- means associated with said compare means for changing the voltage level of said position-command signal.

9. A machine tool control system for generating a command-position signal for each axis of a multiaxis machine tool comprising:
- a source of signals indicating the desired travel of each machine tool axis for each straight line cut;
- number generating means;
- means connecting said source to said number generating means;
- said number generating means being responsive to signals supplied by said source to generate representations of numbers indicating the times of rise and fall of each command-position signal;
- register means;
- means connecting said number generating means to said register means for transmitting to said register means the ones of said representations of numbers which indicate the times of rise and fall of the command-position signal associated with each of said axes;
- reference counting means;
- compare means associated with said register means, said compare means receiving a first input from said register means and a second input from said reference counting means, said compare means producing an output signal when the contents of said register means is equal to the contents of said reference counter means, and
- means associated with said compare means for changing the voltage level of one of said position-command signals.

10. The machine tool control system of claim 9 wherein;
- the output of said compare means is operatively connected to said number generating means;
- said number generating means being responsive to an output signal from said compare means for supplying a new one of said representations of numbers to said register means.

11. In a machine tool system comprising at least one machine tool having at least one axis of motion, and a source of signals indicating the desired travel of said axis for each straight line cut; a machine tool control system for generating a command-position signal for said axis comprising:
- number generating means connected to said source of signals for generating numbers representing the times of rise and fall of said command-position signal;
- phase analog means connected to said number generating means and being responsive to said numbers for generating said command-position signal; and
- cycle control means connected to said phase analog means and to said number generating means for causing said number generating means to supply a new one of said numbers to said phase analog means after each rise and each fall of said command-position signal.

12. The machine tool control system of claim 11 wherein said phase analog means comprises:
- reference counting means;
- register means for storing each of said numbers;
- compare means operatively connected to said reference counting means and to said register means for producing an output signal when the contents of said reference counter means equal the contents of said register means; and
- bistable signal producing means operatively connected to said compare means, said bistable means generating said position command signal by changing its state each time that said compare means produces an output signal.

13. The machine tool control system of claim 12 wherein said cycle control means comprises:
- axis indicating means manifesting a signal identifying said axis;
- decoding means connected to said axis indicating means responsive to said identifying signal to produce a decoded signal;
- two-state means having a first state producing a first signal and a second state producing a second signal, said two-state means being operatively connected to said compare means so as to assume said first state when said compare means produces an output signal;
- concurrence means connected to said two-state means and said decoding means responsive to the concurrence of said first signal and said decoded signal to produce a concurrence signal;
- means connected to said concurrence means responsive to said concurrence signal to prevent a change in the signal manifested by said axis indicating means;

timing means connected to said concurrence means responsive to said concurrence signal to generate timing signals to cause said number generating means to supply a new one of said numbers to said register means; and means connected to said timing means responsive to the conclusion of generating said timing signals to cause said two-state means said second state.

14. The machine tool control system of claim 13 wherein said number generating means comprises:

means for generating
a first number representing the first time at which said command-position signal is to change; and
a second number representing the increment in time between successive changes of said command-position signal;

storage means for storing said first number and said second number;

storage register means connected to said storage means;

addressing means operatively connected to said axis indicating means to cause the contents of said storage means to be placed in said storage register means;

transmission means connected between said storage register means and said register means;

gating means operatively connected to said timing means to cause said first number to be transmitted to said register means;

adding means connected to said storage register means to add said second number to said first number to produce a sum; and means for placing said sum in the portion of said storage means which previously stored said first number.

15. The machine tool control system of claim 14 wherein said number generating means further comprises:

end means for determining that a straight line cut has been completed, said end means causing said number generating means to generate new first and second numbers relating to a next straight line cut, and to store said numbers in said storage means.

16. The machine tool control system of claim 15 further comprising:

rate means for varying the feed-rate of said machine tool.

17. The machine tool control system of claim 16 wherein said rate means comprise means connected to said reference counting means for reducing the speed of operation of said reference counting means.

18. The machine tool control system of claim 16 wherein said rate means comprises:

means connected to said number generating means for manifesting a predetermined feed-rate fraction; and means within said number generating means for generating a new first number and a new second number so as to reduce the feed-rate of said machine tool by said feed-rate fraction.

19. In a machine tool system comprising at least one multiaxis machine tool and a source of signals indicating the desired travel of each axis for each straight line cut; a machine tool control system for generating a command-position signal for each axis comprising:

number generating means connected to said source of signals for generating numbers representing the times of rise and fall of each command-position signal;

phase analog means connected to said number generating means and being responsive to said numbers for generating each command-position signal; and cycle control means connected to said phase analog means and to said number generating means for causing said number generating means to supply a new one of said numbers to said phase analog means after each rise and each fall of each command-position signal;

said phase analog means comprising:
reference counting means;
register means associated with each of said axes for storing said numbers;
compare means operatively connected to said reference counting means and to each of one of said register means for producing an output signal when the contents of said reference counter means equals the contents of said register means; and
bistable signal producing means operatively connected to each of said compare means, said bistable means each generating one of said position command signals by changing its state each time that its associated compare means produces an output signal;

said cycle control means comprising:
axis indicating means manifesting successive signals identifying each axis;
decoding means responsive to said identifying signals to produce a decoded signal;
a plurality of two-state means associated with each axis having a first state producing a first signal and a second state producing a second signal, each one of said two-state means being operatively connected to one of said compare means so as to assume said first state when said one of said compare means produces an output signal;
concurrence means responsive to the concurrence of said first signal and an associated decoded signal to produce a concurrence signal;
means connected to said concurrence means responsive to said concurrence signal to prevent a change in the signal manifested by said axis indicating means;
timing means connected to said concurrence means responsive to said concurrence signal to generate timing signals to cause said number generating means to supply a new one of said numbers to said one of said register means; and
means connected to said timing means responsive to the conclusion of generating said timing signals to cause said one of two-state means to assume said second state;

said number generating means comprising;
means for generating
a plurality of first numbers representing the first time at which each of said command position signals is to change; and
a plurality of second numbers representing the increment in time between successive changes of said command-position signals;

storage means for storing said first number and said second numbers;
storage register means connected to said storage means;
addressing means operatively connected to said axis indicating means to cause the contents of said storage means to be placed in said storage register means;
transmission means connected between said storage register means and said one of said register means;
gating means operatively connected to said timing means to cause one of said first numbers to be transmitted to said one of said register means;
adding means connected to said storage register means to add said one of said first numbers to its associated second number to produce a sum; and
means for placing said sum in the portion of said storage means which previously stored said one of said first numbers.